United States Patent [19]
Hochman et al.

[11] Patent Number: 5,915,116
[45] Date of Patent: Jun. 22, 1999

[54] TIME VALUE MANIPULATION

[75] Inventors: Theodor Hochman, Boston; George Nichols, Sudbury, both of Mass.

[73] Assignee: FMR Corp., Boston, Mass.

[21] Appl. No.: 08/813,910

[22] Filed: Mar. 7, 1997

[51] Int. Cl.[6] .................................................. G06F 9/45
[52] U.S. Cl. ........................ 395/705; 395/708; 395/704
[58] Field of Search ................................... 395/704, 705, 395/708, 710, 183.11, 183.14; 707/1, 101, 6, 100, 102, 103, 104, 201, 203, 205

[56] References Cited

U.S. PATENT DOCUMENTS

| | | | |
|---|---|---|---|
| 5,630,118 | 5/1997 | Shaughnessy | 395/601 |
| 5,668,989 | 9/1997 | Mao | 395/612 |
| 5,694,605 | 12/1997 | Miyaji et al. | 395/705 |
| 5,701,489 | 12/1997 | Bates et al. | 395/705 |
| 5,740,442 | 4/1998 | Cox et al. | 395/704 |

OTHER PUBLICATIONS

IBM Guide, "The Year 2000 and 2–Digit Dates: A Guide for Planning and Implementation", IBM, 6th ed., 1996.

Gold, "Centura Beats Year 2000 Problem With New Software", Newsbytes News Network, Jan. 6, 1996.

Furman et al., "Party When Its 1999", (http://www.year2000.com/archive/NFparty.html), 1997.

Real World Training Systems LLC, (http://www.year2000.com/vendors/realworld.html).

Into 2000, Inc., (http://www.year2000.com/vendors/into2000.html), 1997.

Formal Systems, "Year 2000 Solutions for Natural" (http://www.year2000.com/vendors/formal/formal.html), 1997.

Prince Software, "Portal 2000 The Gateway to the Next Millennium" (http://www/year2000.com/vendors/prince-.html), 1996.

Century Services, Inc., "Vision 2000 A Total Solution to Your Year 2000 Date Change", (http://www.year2000.com/vendors/century/century.html), 1996.

Data Integrity, "Automated Millennium Solution from Data Integrity Provides Faster, Lower–Cost Remedy to Millennium Bug", Business Wire, Jan. 21, 1997.

"Migration Tool Gets Add.on to Fix Year2000 Problem", Buckler, Newsbytes, pp. 1–2, Feb. 1996.

"Companies Wait for the Silver Bullet", O'Flahertie, Asian Business Review, pp. 22–24, Jan. 1996.

(List continued on next page.)

*Primary Examiner*—Tariq R. Hafiz
*Assistant Examiner*—Kakali Chaki
*Attorney, Agent, or Firm*—Fish & Richardson P.C.

[57] ABSTRACT

A method is provided for use in manipulating a time value. Source code text is stored in a first memory and constitutes source code instructions. The source code instructions define a year variable text string representing a year variable data structure for storing the time value. The year variable text string is used in at least one of the source code instructions. Machine code computer data constituting directly-executable instructions is derived from the source code text and stored in a second memory. Each source code instruction defines the contents of a corresponding portion of the machine code computer data and defines a corresponding location in the second memory set for storing the corresponding portion. The machine code computer data are formatted in accordance with a machine language. Each source code instruction is identified that includes the year variable text string. Each of the identified source code instructions is parsed to determine whether the identified source code instruction pertains to an arithmetic operation involving the year variable text string or to comparing year values. If the identified source code instruction pertains to either, computer data are inserted in the second memory at the location corresponding to the identified source code instruction. The computer data constitutes at least one directly-executable instruction for causing an interpretation of the time value in accordance with a predetermined interpretation scheme.

38 Claims, 21 Drawing Sheets

OTHER PUBLICATIONS

"Solving the Year 2000 Problem", Meador, http://techweb.cmp.com/IW, pp. 44–51, Feb. 1996.

"Tool Up for Year 2000", Baum, Datamation, pp. 49–53, Jan. 1996.

"X Pediter Helps Programmers Find and Edit Date Records", Olsen, Government Computer News, v15 n12 p. 46, Jun. 1996.

"Handling 32 Bit Integers in Different Number Formats", IBM Tech. Disclosure Bulletin, vol. 39, No. 1 pp. 325–327, Jan. 1996.

"A Scaleable, Automated Process for Year 2000 System Correction", Hart et al., Proc. of the ICSE–18, IEEE, 1996.

"Translate 2000", http://www.Princesoftware.com/trans2.htm, pp. 1–4, Mar. 1997.

MACHINE CODE MEMORY

100

| MEM. ADD. | DATA | MEM. ADD. | DATA | MEM. ADD. | DATA | MEM. ADD. | DATA | MEM. ADD. | DATA |
|---|---|---|---|---|---|---|---|---|---|
| 2000 | 50 | 200A | 2B | 2014 | | 201E | | 2028 | |
| 2001 | 51 | 200B | C1 | 2015 | | 201F | | 2029 | |
| 2002 | 26 | 200C | A3 | 2016 | | 2020 | | 202A | |
| 2003 | A1 | 200D | 92 | 2017 | | 2021 | | 202B | |
| 2004 | F1 | 200E | 09 | 2018 | | 2022 | | 202C | |
| 2005 | 07 | 200F | 59 | 2019 | | 2023 | | 202D | |
| 2006 | 8B | 2010 | 58 | 201A | | 2024 | | 202E | |
| 2007 | 0E | 2011 | | 201B | | 2025 | | 203F | |
| 2008 | F0 | 2012 | | 201C | | 2026 | | 2030 | |
| 2009 | 03 | 2013 | | 201D | | 2027 | | 2031 | |

| | MEMORY ADDRESSES | MACHINE CODE DATA | INSTRUCTION | |
|---|---|---|---|---|
| 250 { | 2000 | 50 | PUSH AX | 202 |
| 252 { | 2001 | 51 | PUSH CX | 204 |
| 254 { | 2002 | 26 | ES: | 206 |
| 256 { | 2003-2005 | A1 F1 07 | MOV AX, [07F1] | 208 |
| 258 { | 2006-2009 | 8B 0E F0 03 | MOV CX, [03F0] | 210 |
| 260 { | 200A-200B | 2B C1 | SUB AX, CX | 212 |
| 262 { | 200C-200E | A3 92 09 | MOV [0992], AX | 214 |
| 264 { | 200F | 59 | POP CX | 216 |
| 266 { | 2010 | 58 | POP AX | 218 |
| | | | | |
| | | | | |

FIG. 5

DATA DIVISION.                                          700

•
    •
    •

05  PURCHASE-DATE
        10  PURCHASE-YEAR       PIC 999  ← 702
        10  PURCHASE-MONTH      PIC 99
        10  PURCHASE-DAY        PIC 99
    05  DAMAGE-DATE
        10  DAMAGE-YEAR         PIC 999  ← 704
        10  DAMAGE-MONTH        PIC 99
        10  DAMAGE-DAY          PIC 99
    05  DIFFERENCE-PERIOD
        10  DIFFERENCE-YEARS    PIC 99
        10  DIFFERENCE-MONTHS   PIC 99
        10  DIFFERENCE-DAYS     PIC 99

PROCEDURE DIVISION.
    START-RUN.

•
        •
        •

PERFORM READ-VALUES THRU READ-EXIT.

•
        •
        •

DISPLAY 'PLEASE ENTER DAMAGE DATE'

•
        •
        •

IF DAMAGE-YEAR < 76 ADD 100 TO DAMAGE-YEAR ← 706
IF PURCHASE-YEAR < 76 ADD 100 TO PURCHASE-YEAR ← 708
SUBTRACT PURCHASE-YEAR FROM DAMAGE-YEAR GIVING ← 710
DIFFERENCE-YEARS

•
        •
        •

DISPLAY 'PLEASE ENTER DAMAGE DATE'

•
        •
        •

STOP RUN.
    EXIT.

MACHINE CODE MEMORY 100

| MEM. ADD. | DATA | MEM. ADD. | DATA | MEM. ADD. | DATA | MEM. ADD. | DATA | MEM. ADD. | DATA |
|---|---|---|---|---|---|---|---|---|---|
| 2000 | 50 | 200A | 05 | 2014 | F0 | 201E | A3 | 2028 | 8B | 2032 | F8 |
| 2001 | 26 | 200B | 64 | 2015 | 03 | 201F | F0 | 2029 | 0E | 2033 | |
| 2002 | A1 | 200C | 00 | 2016 | 3D | 2020 | 03 | 202A | F0 | 2034 | |
| 2003 | F1 | 200D | A3 | 2017 | 4C | 2021 | 58 | 202B | 03 | 2035 | |
| 2004 | 07 | 200E | F1 | 2018 | 00 | 2022 | 50 | 202C | 2B | 2036 | |
| 2005 | 3D | 200F | 07 | 2019 | 73 | 2023 | 51 | 202D | C1 | 2037 | |
| 2006 | 4C | 2010 | 58 | 201A | 03 | 2024 | 26 | 202E | A3 | 2038 | |
| 2007 | 00 | 2011 | 50 | 201B | 05 | 2025 | A1 | 203F | 92 | 2039 | |
| 2008 | 73 | 2012 | 26 | 201C | 64 | 2026 | F1 | 2030 | 09 | 203A | |
| 2009 | 03 | 2013 | A1 | 201D | 00 | 2027 | 07 | 2031 | 59 | 203B | |

| | MEMORY ADDRESSES | MACHINE CODE DATA | INSTRUCTION | |
|---|---|---|---|---|
| 302 | 2000 | 50 | PUSH AX | 352 |
| 304 | 2001 | 26 | ES: | 354 |
| 306 | 2002-2004 | A1 F1 07 | MOV AX, [07F1] | 356 |
| 308 | 2005-2007 | 3D 4C 00 | CMP AX, 004C | 358 |
| 310 | 2008-2009 | 73 03 | JNB 200D | 360 |
| 312 | 200A-200C | 05 64 00 | ADD AX, 0064 | 362 |
| 314 | 200D-200F | A3 F1 07 | MOV [07F1], AX | 364 |
| 316 | 2010 | 58 | POP AX | 366 |
| 318 | 2011 | 50 | PUSH AX | 368 |
| 320 | 2012 | 26 | ES: | 370 |
| 322 | 2013-2015 | A1 F0 03 | MOV AX, [03F0] | 372 |
| 324 | 2016-2018 | 3D 4C 00 | CMP AX, 004C | 374 |
| 326 | 2019-201A | 73 03 | JNB 201E | 376 |
| 328 | 201B-201D | 05 64 00 | ADD AX, 0064 | 378 |
| 330 | 201E-2020 | A3 F0 03 | MOV [03F0], AX | 380 |
| 332 | 2021 | 58 | POP AX | 382 |
| 334 | 2022 | 50 | PUSH AX | 384 |
| 336 | 2023 | 51 | PUSH CX | 386 |
| 338 | 2024 | 26 | ES: | 388 |
| 340 | 2025-2027 | A1 F1 07 | MOV AX, [07F1] | 390 |
| 342 | 2028-202B | 8B 0E F0 03 | MOV CX, [03F0] | 392 |
| 344 | 202C-202D | 2B C1 | SUB AX, CX | 394 |
| 346 | 202E-2030 | A3 92 09 | MOV [0992], AX | 396 |
| 348 | 2031 | 59 | POP CX | 398 |
| 350 | 2032 | 58 | POP AX | 400 |

DATA DIVISION.
⋮

```
05  PURCHASE-DATE                              750
    10  PURCHASE-YEAR     PIC 99    TYPE IS DATE ←752
    10  PURCHASE-MONTH    PIC 99
    10  PURCHASE-DAY      PIC 99
05  DAMAGE-DATE
    10  DAMAGE-YEAR       PIC 99    TYPE IS DATE ←754
    10  DAMAGE-MONTH      PIC 99
    10  DAMAGE-DAY        PIC 99
05  DIFFERENCE-PERIOD
    10  DIFFERENCE-YEARS  PIC 99
    10  DIFFERENCE-MONTHS PIC 99
    10  DIFFERENCE-DAYS   PIC 99
```
⋮

FIG. 9A

```
PROCEDURE DIVISION.                            750
    START-RUN.
           .
           .
           .
        PERFORM READ-VALUES THRU READ-EXIT
           .
           .
           .
        DISPLAY 'PLEASE ENTER DAMAGE DATE'
           .
           .                                   756
           .
    SUBTRACT PURCHASE-YEAR FROM DAMAGE-YEAR GIVING DIFFERENCE-YEARS
           .
           .
           .
        DISPLAY 'OWNERSHIP PERIOD IS', DIFFERENCE-PERIOD
           .
           .
           .
                STOP RUN.
    EXIT.
```

FIG. 9B

MACHINE CODE MEMORY

100

| MEM. ADD. | DATA | MEM. ADD. | DATA | MEM. ADD. | DATA | MEM. ADD. | DATA | MEM. ADD. | DATA |
|---|---|---|---|---|---|---|---|---|---|
| 2000 | 50 | 200A | A1 | 2014 | 09 | 2030 | 3D | | |
| 2001 | 51 | 200B | F1 | 2015 | 59 | 2031 | 4C | | |
| 2002 | 26 | 200C | 07 | 2016 | 58 | 2032 | 00 | | |
| 2003 | A1 | 200D | E8 | 2017 | | 2033 | 73 | | |
| 2004 | F0 | 200E | 23 | 2018 | | 2034 | 03 | | |
| 2005 | 03 | 200F | 00 | 2019 | | 2035 | 05 | | |
| 2006 | E8 | 2010 | 2B | 201A | | 2036 | 64 | | |
| 2007 | 27 | 2011 | C1 | 201B | | 2037 | 00 | | |
| 2008 | 00 | 2012 | A3 | 201C | | 2038 | C3 | | |
| 2009 | 91 | 2013 | 92 | 201D | | | | | |

| MEMORY ADDRESSES | MACHINE CODE DATA | INSTRUCTION | |
|---|---|---|---|
| 502 { 2000 | 50 | PUSH AX | —536 |
| 504 { 2001 | 51 | PUSH CX | —538 |
| 506 { 2002 | 26 | ES: | —540 |
| 508 { 2003-2005 | A1 F0 03 | MOV AX, [03F0] | —542 |
| 510 { 2006-2008 | E8 27 00 | CALL 2030 | —544 |
| 512 { 2009 | 91 | XCHG CX, AX | —546 |
| 514 { 200A-200C | A1 F1 07 | MOV AX, [07F1] | —548 |
| 516 { 200D-200F | E8 23 00 | CALL 2030 | —550 |
| 518 { 2010-2011 | 2B C1 | SUB AX, CX | —552 |
| 520 { 2012-2014 | A3 92 09 | MOV [0992], AX | —554 |
| 522 { 2015 | 59 | POP CX | —556 |
| 524 { 2016 | 58 | POP AX | —558 |
| 526 { ⋮ | ⋮ | ⋮ | |
| 528 { 2030-2032 | 3D 4C 00 | CMP AX, 004C | —560 |
| 530 { 2033-2034 | 73 03 | JNB 2038 | —562 |
| 532 { 2035-2037 | 05 64 00 | ADD AX, 0064 | —564 |
| 534 { 2038 | C3 | RET | —566 |

MACHINE CODE WINDOWING LOGIC

FIG. 11

DATA DIVISION.                                              770

· · ·

```
05  PURCHASE-DATE
    10  PURCHASE-YEAR        PIC 99
    10  PURCHASE-MONTH       PIC 99
    10  PURCHASE-DAY         PIC 99
05  DAMAGE-DATE
    10  DAMAGE-YEAR          PIC 99
    10  DAMAGE-MONTH         PIC 99
    10  DAMAGE-DAY           PIC 99
05  EXPIRATION-DATE
    10  EXPIRATION-YEAR      PIC 99   ← 772
    10  EXPIRATION-MONTH     PIC 99
    10  EXPIRATION-DAY       PIC 99
```

PROCEDURE DIVISION.
    START-RUN.

·
          ·
          ·

PERFORM READ-VALUES THRU READ-EXIT

·
          ·
          ·

DISPLAY 'PLEASE ENTER DAMAGE DATE'

·
          ·
          ·

ADD 10 TO PURCHASE-YEAR GIVING EXPIRATION-YEAR ← 774

·
          ·
          ·

IF DAMAGE-DATE > EXPIRATION-DATE DISPLAY "WARRANTY EXPIRED" ← 774

·
          ·
          ·

STOP RUN.
    EXIT.

FIG. 12B

DATA DIVISION.            780

· · ·

```
05  PURCHASE-DATE
    10  PURCHASE-YEAR        PIC 999    ← 782
    10  PURCHASE-MONTH       PIC 99
    10  PURCHASE-DAY         PIC 99
05  DAMAGE-DATE
    10  DAMAGE-YEAR          PIC 999    ← 784
    10  DAMAGE-MONTH         PIC 99
    10  DAMAGE-DAY           PIC 99
05  EXPIRATION-DATE
    10  EXPIRATION-YEAR      PIC 999    ← 786
    10  EXPIRATION-MONTH     PIC 99
    10  EXPIRATION-DAY       PIC 99
```

PROCEDURE DIVISION.
    START-RUN.

·

·

·

PERFORM READ-VALUES THRU READ-EXIT

·

·

·

DISPLAY 'PLEASE ENTER DAMAGE DATE'

·

·

·

ADD 10 TO PURCHASE-YEAR GIVING EXPIRATION-YEAR ← 787

IF EXPIRATION-YEAR > 99 SUBTRACT 100 FROM EXPIRATION YEAR ← 788   SOURCE CODE 2-DIGIT LOGIC

·

·

·

IF EXPIRATION-YEAR < 76 ADD 100 TO EXPIRATION-YEAR ← 790

IF DAMAGE-YEAR < 76 ADD 100 TO DAMAGE-YEAR ← 792

IF DAMAGE-DATE > EXPIRATION-DATE DISPLAY "WARRANTY EXPIRED"

·

·

·

STOP RUN.
    EXIT.

FIG. 13B

DATA DIVISION.

· · ·

```
                                        800
                                         ↙
    05  PURCHASE-DATE
         10  PURCHASE-YEAR       PIC 99      TYPE IS DATE ← 802
         10  PURCHASE-MONTH      PIC 99
         10  PURCHASE-DAY        PIC 99
    05  DAMAGE-DATE
         10  DAMAGE-YEAR         PIC 99      TYPE IS DATE ← 804
         10  DAMAGE-MONTH        PIC 99
         10  DAMAGE-DAY          PIC 99
    05  EXPIRATION-DATE
         10  EXPIRATION-YEAR     PIC 99      TYPE IS DATE ← 806
         10  EXPIRATION-MONTH    PIC 99
         10  EXPIRATION-DAY      PIC 99
```

PROCEDURE DIVISION.
    START-RUN.
        .
        .
        .
        PERFORM READ-VALUES THRU READ-EXIT
        .
        .
        .
        DISPLAY 'PLEASE ENTER DAMAGE DATE'
        .
        .
        .
ADD 10 TO PURCHASE-YEAR GIVING EXPIRATION-YEAR  ← 808
        .
        .
        .
IF DAMAGE-DATE > EXPIRATION-DATE DISPLAY "WARRANTY EXPIRED"  ← 810
        .
        .
        .
        STOP RUN.
    EXIT.

FIG. 14B

MACHINE CODE MEMORY 100

| MEM. ADD. | DATA | MEM. ADD. | DATA | MEM. ADD. | DATA | MEM. ADD. | DATA | MEM. ADD. | DATA |
|---|---|---|---|---|---|---|---|---|---|
| 2000 | 50 | 200A | 00 | 2024 | E8 | 202E | 3B | 2045 | 05 | 204F | 64 |
| 2001 | 26 | 200B | A3 | 2025 | 19 | 202F | C1 | 2046 | 64 | 2050 | 00 |
| 2002 | A1 | 200C | 92 | 2026 | 00 | 2030 | 77 | 2047 | 00 | 2051 | C3 |
| 2003 | F0 | 200D | 09 | 2027 | 91 | 2031 | 2E | 2048 | C3 | | |
| 2004 | 03 | 200E | 58 | 2028 | A1 | | | 2049 | 3D | | |
| 2005 | 05 | | | 2029 | F1 | 2040 | 3D | 204A | 64 | | |
| 2006 | 0A | 2020 | 26 | 202A | 07 | 2041 | 4C | 204B | 00 | | |
| 2007 | 00 | 2021 | A1 | 202B | E8 | 2042 | 00 | 204C | 72 | | |
| 2008 | E8 | 2022 | 92 | 202C | 12 | 2043 | 73 | 204D | 03 | | |
| 2009 | 3E | 2023 | 09 | 202D | 00 | 2044 | 03 | 204E | 2D | | |

FIG. 15

| | MEMORY ADDRESSES | MACHINE CODE DATA | INSTRUCTION | |
|---|---|---|---|---|
| 602 { | 2000 | 50 | PUSH AX | —652 |
| 604 { | 2001 | 26 | ES: | —654 |
| 606 { | 2002-2004 | A1 F0 03 | MOV AX, [03F0] | —656 |
| 608 { | 2005-2007 | 05 0A 00 | ADD AX, 000A | —658 |
| 610 { | 2008-200A | E8 3E 00 | CALL 2049 | —660 |
| 612 { | 200B-200D | A3 92 09 | MOV [0992], AX | —662 |
| 614 { | 200E | 58 | POP AX | —664 |
| 616 { | ⋮ | ⋮ | ⋮ | |
| 618 { | 2020 | 26 | ES: | —666 |
| 620 { | 2021-2023 | A1 92 09 | MOV AX, [0992] | —668 |
| 622 { | 2024-2026 | E8 19 00 | CALL 2040 | —670 |
| 624 { | 2027 | 91 | XCHG CX, AX | —672 |
| 626 { | 2028-202A | A1 F1 07 | MOV AX, [07F1] | —674 |
| 628 { | 202B-202D | E8 12 00 | CALL 2040 | —676 |
| 630 { | 202E-202F | 3B C1 | CMP AX, CX | —678 |
| 632 { | 2030-2031 | 77 2E | JA 2060 | —680 |
| 634 { | ⋮ | ⋮ | ⋮ | |
| 636 { | 2040-2042 | 3D 4C 00 | CMP AX, 004C | —682 |
| 638 { | 2043-2044 | 73 03 | JNB 2048 | —684 |
| 640 { | 2045-2047 | 05 64 00 | ADD AX, 0064 | —686 |
| 642 { | 2048 | C3 | RET | —688 |
| 644 { | 2049-204B | 3D 64 00 | CMP AX, 0064 | —690 |
| 646 { | 204C-204D | 72 03 | JB 2051 | —692 |
| 648 { | 204E-2050 | 2D 64 00 | SUB AX, 0064 | —694 |
| 650 { | 2051 | C3 | RET | —696 |

Rows 636–642 braced as MACHINE CODE 2-DIGIT LOGIC
Rows 644–650 braced as MACHINE CODE WINDOWING LOGIC

FIG. 16

TIME VALUE MANIPULATION

BACKGROUND OF THE INVENTION

The invention relates to manipulating a time value.

Dates may be stored by a computer in an "mm/dd/yy" format (e.g., Feb. 1, 1996 stored as 02/01/96). The year value "96" is ambiguous with respect to the century intended, the "19" being assumed. For example, the computer may calculate a length of ownership interval to keep track of 10-year warranty periods for refrigerators sold. If a refrigerator bought on Feb. 1, 1992 (02/01/92) breaks down on May 7, 1996 (05/07/96), the calculation involves subtracting "92" from "96" to produce "4" as expected. However, when the same refrigerator breaks down on May 7, 2001, the computer mishandles keeping track of the associated warranty period, because then the calculation involves subtracting "92" from "01", which produces an erroneous result (such as "−91" or "91") or causes the computer to cease functioning properly. Such mishandling occurs for any breakdown date after Dec. 31, 1999.

The calculation is executed in accordance with machine code (i.e., computer instructions that are directly executable by the computer) derived by compiler software from source code (i.e., human-readable computer instructions formatted according to a computer language such as Common Business Oriented Language ("COBOL")). To prevent the mishandling described above, the source code may be altered to include "expansion" instructions so that "19" or "20" (i.e., the century intended) is stored and manipulated explicitly. Alternatively, such prevention may be accomplished by altering the source code to include "windowing logic" instructions to specify a predetermined interpretation of a two-digit year value (e.g., that year values correspond to a "window" of years ranging from 1950 through 2049). These source code alterations may be performed manually or by translator software that automatically includes the windowing logic instructions in the source code. The computer then executes in accordance with new machine code derived from the altered source code.

SUMMARY OF THE INVENTION

To reduce mishaps (such as a miscalculated time inverval or expiration date) caused when a time value (e.g., a year value "20") subject to two different interpretations (e.g., "1920" and "2020") is used by machine code that has been derived by compiling source code that is based on the first interpretation, the source code is re-compiled to produce new machine code that includes instructions that use the time value in accordance with the second interpretation. Creating the new machine code directly from the source code, i.e., without first altering the source code in accordance with the second interpretation, saves a step and reduces the chances for error. In addition, such compiling may be accomplished by a compiler software program that rapidly produces new machine code for each source code in an organization, to reduce the amount of time the organization's work is delayed due to such production.

In particular, in one aspect, the invention features a method for reducing an effect caused when machine code uses a time value that is subject to two different interpretations, the machine code having been derived from a human readable procedural instruction sequence that is based on a first one of the interpretations. According to the method, in the derived machine code, instructions are included that use the time value in accordance with a second one of the interpretations, without the human readable procedural instruction sequence having been altered in accordance with the second one of the interpretations.

Implementations of the invention may include one or more of the following features. The human readable procedural instruction sequence may constitute all of the human readable procedural instructions sequences from which the machine code is derived (as opposed to just a portion of an entire source code). The method may further include compiling the human readable procedural instruction sequence, wherein the instructions are included in the derived machine code during the compilation. In addition, the method may include providing an indication of a date that is subject to two different interpretations and, in the human readable procedural instruction sequence, associating the indication with a data declaration. Thus, the compilation is able to determine which of the sequence's data declarations are associated with the two interpretations.

The human readable procedural instruction sequence may be parsed to determine a source of the effect. A computation (on which, e.g., a calculation of a time interval is based) or a comparison of times may serve as the source. The parsing may be based on an indication of a date that is subject to two different interpretations. The human readable procedural instruction sequence may be parsed to determine a potential source of the effect and it may be determined whether the potential source is the source. A warning may be provided, based on the potential source.

The instructions included in the derived machine code may be arranged to use the time value in accordance with the second one of the interpretations at the point in the derived machine code at which the time value is retrieved. A time window (e.g., ranging from 1976 through 2075) may serve as a basis for use of the time value by the instructions included in the derived machine code. The time value may include a year value representing a year, and the year value may lack an explicit indication of the century or millenium of the year. The time value may fall within a 100 year window that spans a century boundary. Use of the time window allows meaningful time intervals (e.g., an interval between two events occurring in different centuries) to be calculated based on the time value.

At least a portion of the human readable procedural instruction sequence may be formatted in accordance with Common Business Oriented Language (COBOL).

The method may also include storing in a first memory: source code text constituting source code instructions for use in controlling a general purpose computer system. The source code text may be formatted in accordance with a source code language (such as COBOL) to allow comprehension by a human programmer. The source code instructions may define a year variable text string representing a year variable data structure for storing the time value. The year variable text string may appear in at least one of the source code instructions. The year variable data structure may be configured to store a year value that is subject to two different interpretations. The year variable text string may be associated with a tag string indicating that the represented year variable data structure is so configured.

By a computer, machine code data may be derived from the source code text and stored in a second memory. The machine code computer data may constitute directly-executable instructions for use in controlling the general purpose computer system. Each source code instruction may define the contents of a corresponding portion of the machine code computer data and defines in the second memory a corresponding location for storing the corresponding portion. The machine code computer data may be formatted in accordance with a machine language to allow the general purpose computer system to determine directly from the machine code computer data how to execute as specified by the directly-executable instructions. The derivation may include identifying each source code instruction that includes the year variable text string. For each identified source code instruction, it may be determined whether the identified source code instruction pertains to an arithmetic operation involving the year value or to comparing the year value to another year value. If the identified source code instruction so pertains, computer data may be inserted in the second memory at the location corresponding to the identified source code instruction. The computer data may constitute at least one directly-executable instruction for causing the general purpose computer system to interpret the year value in accordance with a predetermined interpretation scheme.

This method with these features provides a comprehensive technique for manipulating a time value.

BRIEF DESCRIPTION OF THE DRAWINGS

FIGS. 3A–B, 6A–B, 9A–B, 12A–12B, 13A–B and 14A–14B are listings of source code text.

FIGS. 4, 5, 7, 8, 10, 11, 15, 16 are block diagrams of machine code data.

DESCRIPTION OF THE PREFERRED EMBODIMENTS

Figure 1:
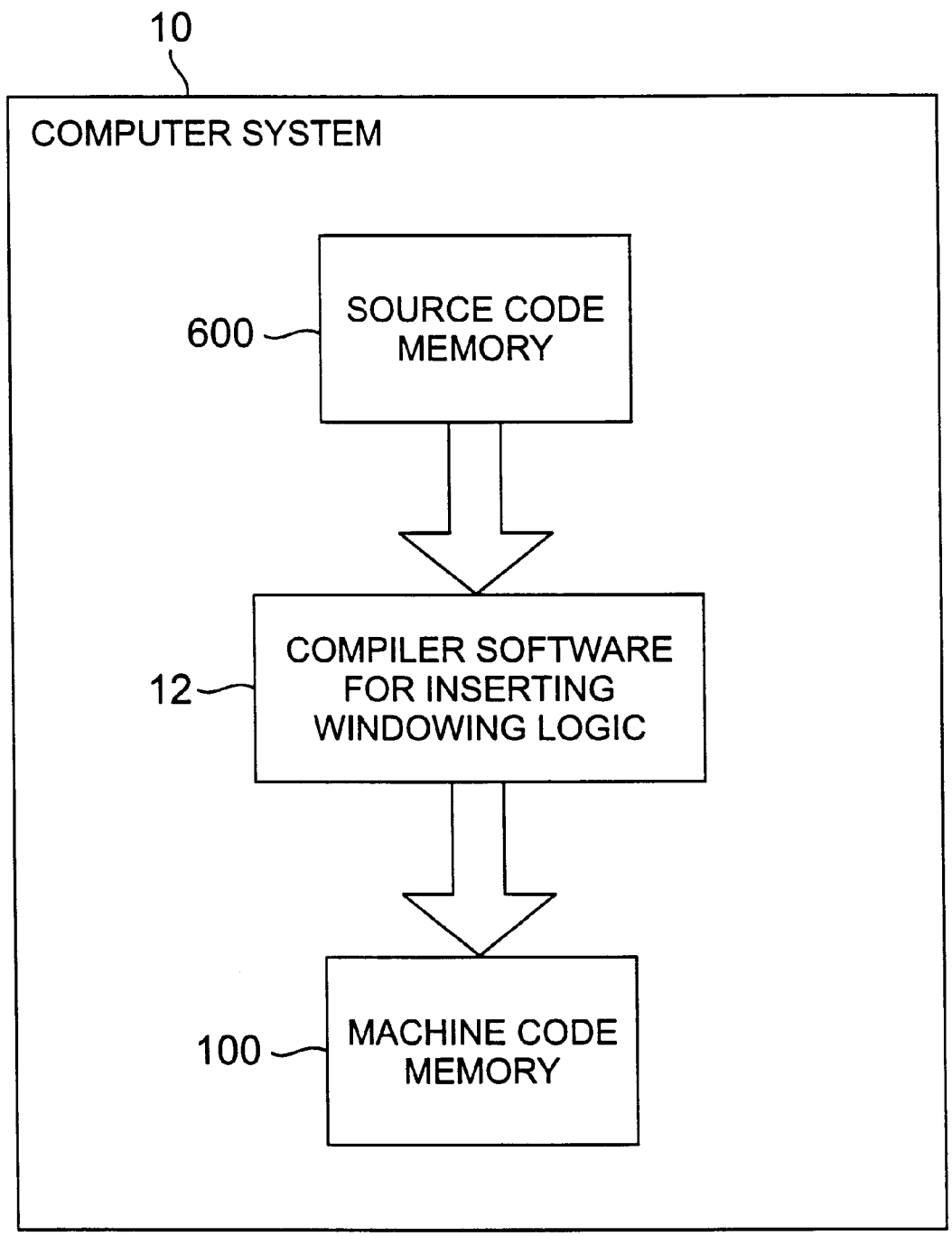
FIG. 1 is a block diagram of a computer system.
Figure 2:
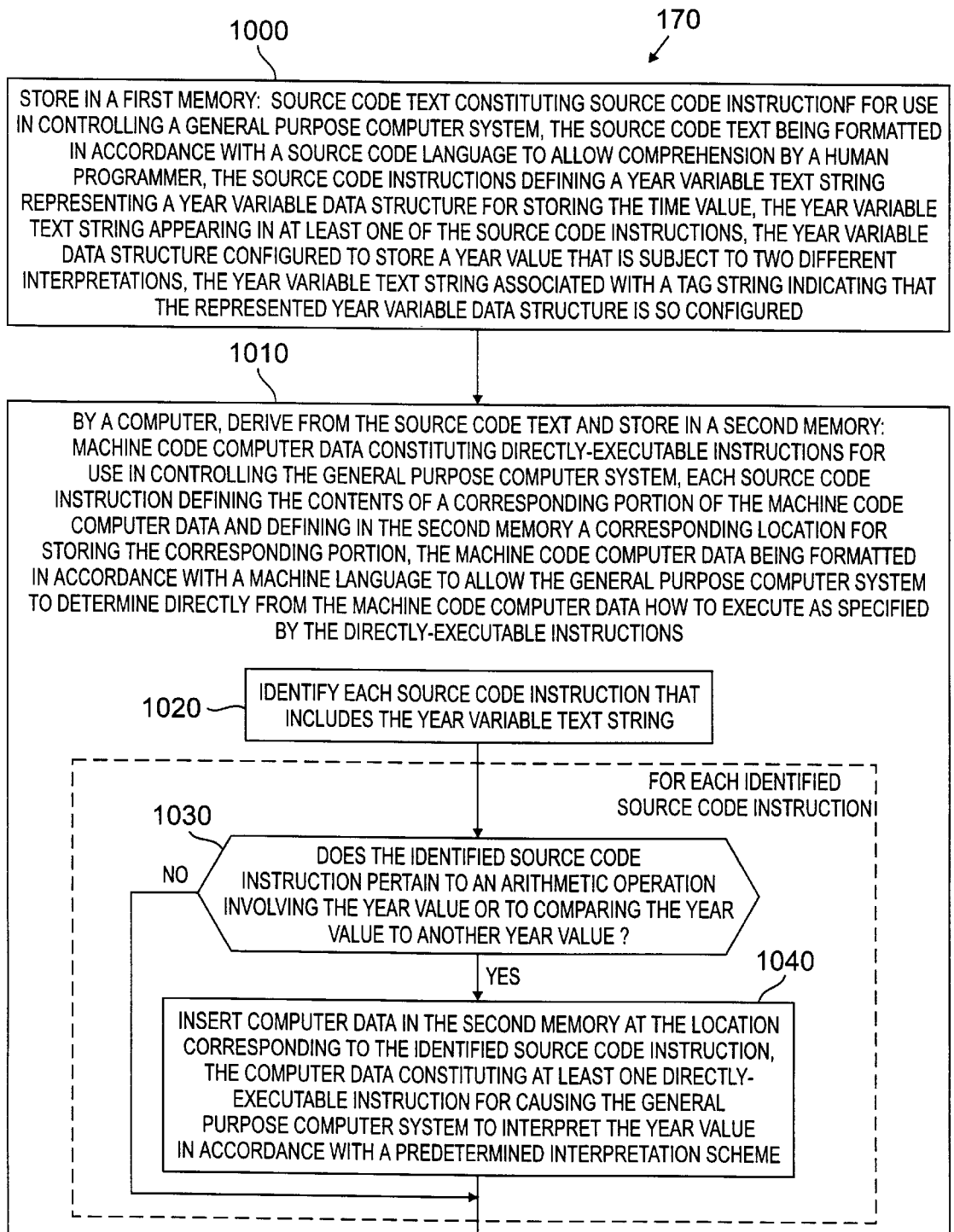
FIG. 2 is a flow diagram of a technique for use with the computer system.

FIG. 1 illustrates a computer system 10 having compiler software 12, a source code memory 600, and a machine code memory 100. FIG. 2 illustrates a procedure 170 used by the compiler software 12.

Figure 3A:
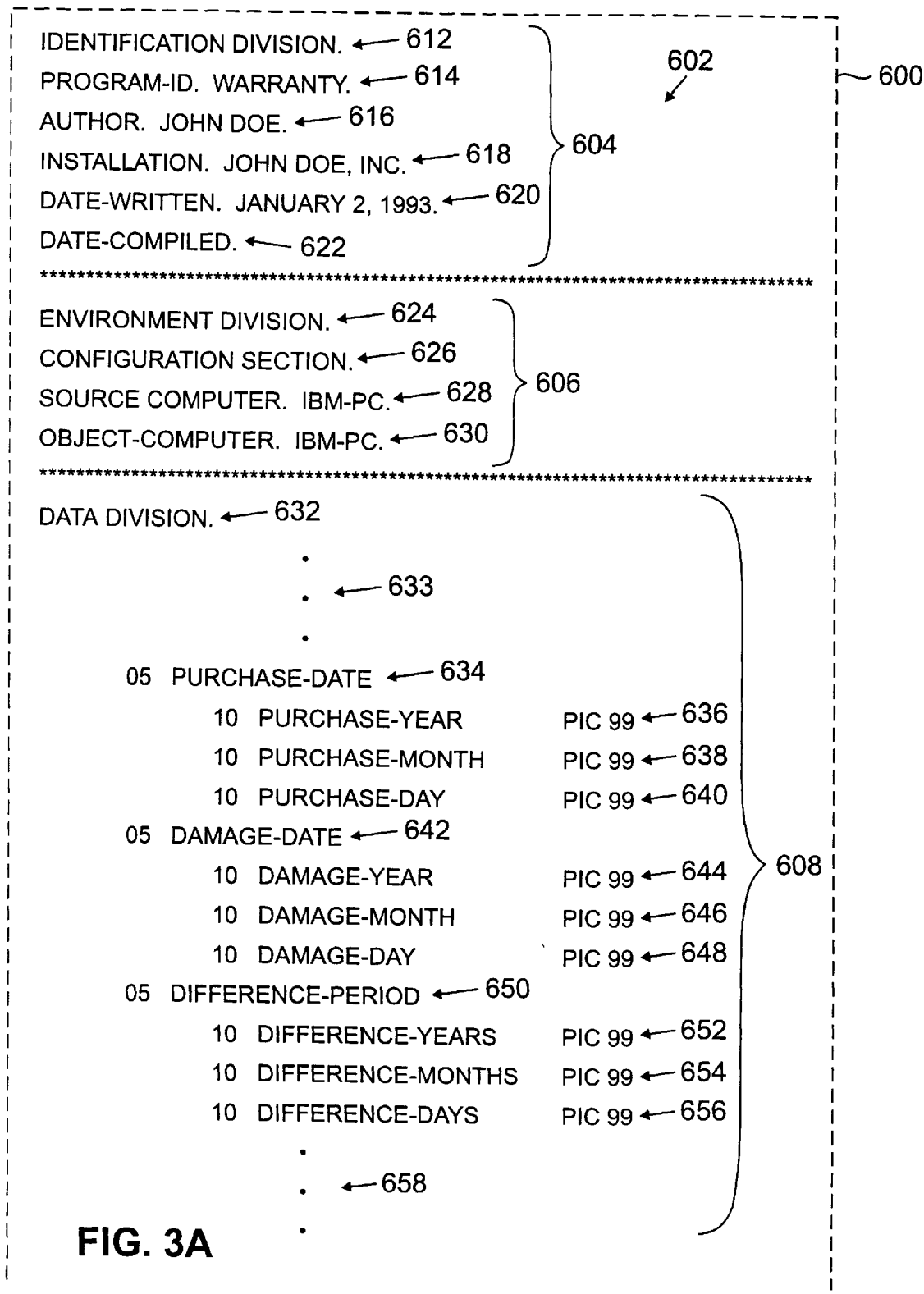
Figure 3B:
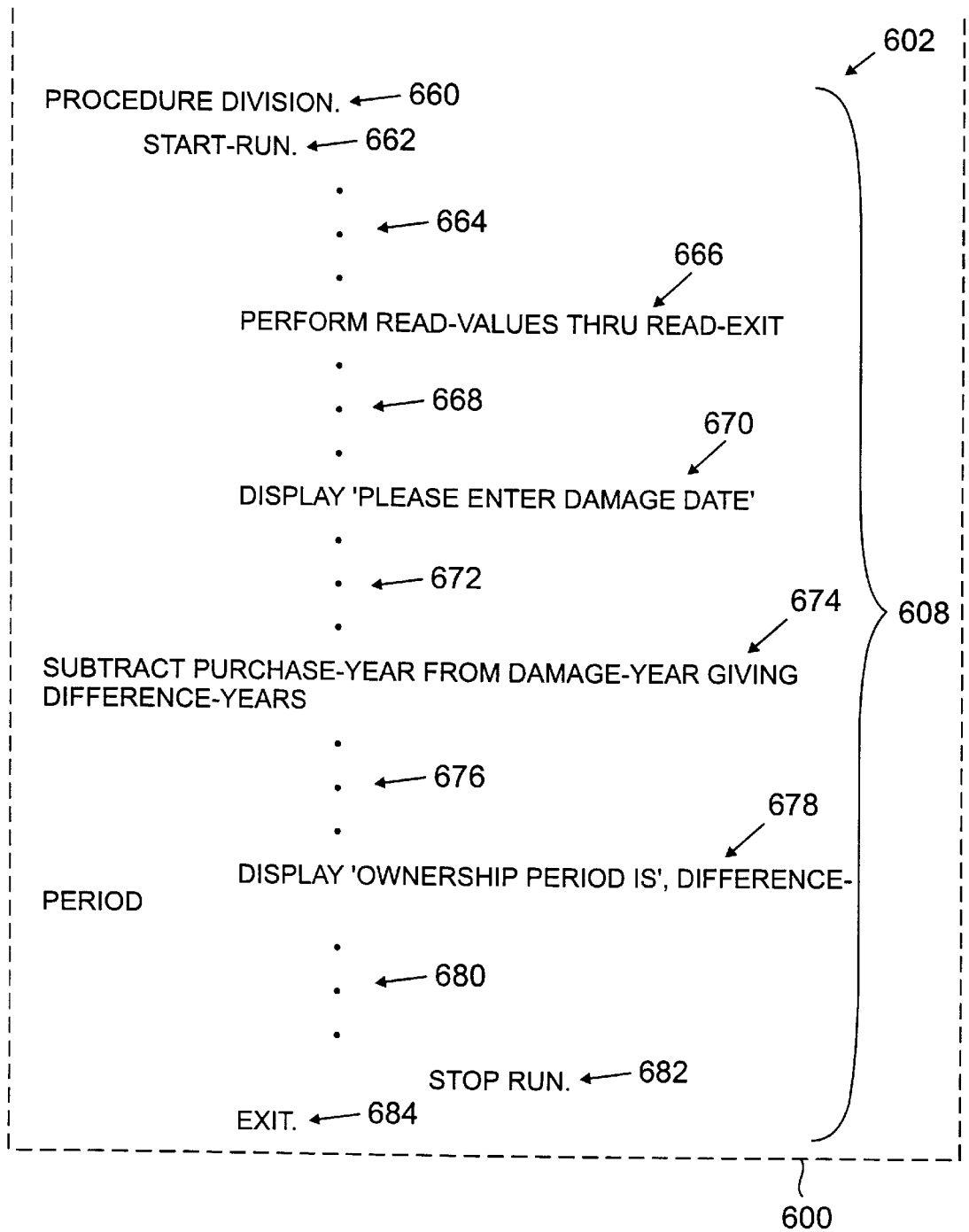

Referring now to FIGS. 3A–3B, the compiler software 12 uses the source code memory 600 to store a source code text 602 formatted in accordance with a source code language such as Common Business Oriented Language ("COBOL") (FIG. 2, step 1000). The source code text 602 defines a source code computer program exemplified in FIGS. 3A–3B by a warranty program for calculating the ownership period of a manufactured item that is associated with a limited-term warranty.

The source code text 602 is stored in the source code memory 600 much as a text document is stored by a word processing program. The source code language format allows a human programmer to comprehend the meaning of the source code text 602. The source code text 602 has multiple sections, including an identification division section 604, an environment division section 606, a data division section 608, and a procedure division 660. The identification division section 604 includes division statement "IDENTIFICATION DIVISION." 612 to indicate that all statements (i.e., sets of text strings) 614 through 622 until the next division statement (division statement "ENVIRONMENT DIVISION." 624) are for the purpose of providing identifying information for the source code text 602.

Statements "PROGRAM-ID. WARRANTY." 614 and "AUTHOR. JOHN DOE." 616 indicate that the source code text 602 is provided for automation of a warranty service and was written by a person named "John Doe." Statements "DATE-WRITTEN. Jan. 2, 1993." 620 and "INSTALLATION. JOHN DOE, INC." 618 indicate that the source code text 602 was written on Jan. 2, 1993 for use by a business named "John Doe, Inc.". Statement "DATE-COMPILED." 622 indicates that the compiler software 12 should add text after statement 622 to indicate the date when the compiler software 12 processes the source code text 602.

The environment division section 606 includes division statement "ENVIRONMENT DIVISION." 624 to indicate that all statements 626, 628, 630 until the next division statement (division statement "DATA DIVISION." 632) are for the purpose of providing information about the computing environment for the source code text 602. Statement "CONFIGURATION SECTION" 626 indicates that the next two statements 628, 630 include information about types of computers specified by the source code text 602. Statement "SOURCE-COMPUTER. IBM-PC." 628 indicates that the source code text 602 has been prepared using a source computer of an IBM PC type. Likewise, statement "OBJECT-COMPUTER. IBM-PC." 630 indicates that directly-executable instructions (shown in FIG. 5) derived from the source code text 602 are to be executed by an object computer of the IBM PC type. In this case, the source and object computers may be the same computer. However, the source and object computers need not be of the same type and each computer may be of a type other than IBM PC, e.g., a mainframe computer such as an IBM System/370 or a Pyramid® NILE™, a minicomputer such as a Digital Equipment Corporation ("DEC") VAX/VMS 6610, or a workstation such as a SPARCstation 20TurboZX Model HS22MP.

The data division section 608 includes statements 634–656 that define data structures (i.e., variables) to be used in the remainder of the source code text 602. (The data division 608 also includes other statements—represented by ellipses 633, 658—that are not described here.)

Statement "05 PURCHASE-DATE" 634 indicates that the next three statements 636, 638, 640 define a group of data structures that may be invoked by reference to the text string "PURCHASE-DATE". Statements "10 PURCHASE-YEAR PIC 99" 636, "10 PURCHASE-MONTH PIC 99" 638, and "10 PURCHASE-DAY PIC 99" 640 indicate that respective text strings "PURCHASE-YEAR", "PURCHASE-MONTH", and "PURCHASE-DAY" refer to purchase-year, purchase-month, and purchase-day data structures, respectively, each able to store a whole number value having a range of "0" through "99".

Similarly, statement "05 DAMAGE-DATE" 642 and the next three statements 644, 646, 648 define damage-year, damage-month, and damage-day data structures, respectively, each able to store a whole number value having a range of "0" through "99". Likewise, statement "05 DIFFERENCE-PERIOD" 650 and the next three statements 652, 654, 656 define difference-years, difference-months, and difference-days data structures, respectively, each able to store a whole number value having a range of "0" through "99".

The procedure division section 610 includes statements 662, 666, 670, 674, 678, 682, 684 that define the flow of the source code computer program. Some statements 666, 670, 674, 678 constitute source code instructions, while other statements 662, 682, 684 indicate starting and stopping points for the source code program. (The procedure division section 610 also includes other statements—represented by ellipses 664, 668, 672, 676, 680—that are not described here.)

Statement "START-RUN" 662 indicates a starting point for the source code computer program. Statement "PERFORM READ-VALUES THRU READ-EXIT" 666 indicates that the purchase-year, purchase-month, and purchase-day data structures are to be loaded with purchase date information available from a long-term memory (not shown), such as a computer file that recorded the purchase. For example, a Customer X may have purchased the manufactured item on Jan. 5, 1992. If so, the long-term memory recorded the purchase and, in accordance with statement 666, the purchase-year, purchase-month, and purchase-day data structures are to be loaded with the numbers "92", "1", and "5", respectively.

Statement "DISPLAY 'PLEASE ENTER DAMAGE DATE'" 670 indicates that a user of the object computer is to be prompted to enter (e.g., by a computer keyboard of the object computer) damage date information, which is loaded into the damage-year, damage-month, and damage-day data structures. In the case of Customer X, the user may be a warranty manager who needs to know the ownership period of the manufactured item. If the ownership period is longer than the warranty period, the warranty manager can report that any necessary repairs are not covered by the warranty, regardless of the cause of the damage. Customer X's manufactured item may have become damaged on May 10, 1995. In accordance with statement 670, the warranty manager is prompted by a computer screen displaying "PLEASE ENTER DAMAGE DATE". In the case of Customer X, the damage-year, damage-month, and damage-day data structures are loaded with the numbers "95", "5", and "10", respectively.

Statement "SUBTRACT PURCHASE-YEAR FROM DAMAGE-YEAR GIVING DIFFERENCE-YEARS" 674 indicates that the number ("92" for Customer X) stored in the purchase-year data structure is to be subtracted from the number ("95" for Customer X) stored in the damage-year data structure to produce another number ("3" for Customer X) to be stored in the difference-years data structure. Other statements (not shown) are used to indicate producing numbers for the difference-months and difference-days data structures. These other statements also indicate making adjustments such as decrementing the number stored in the difference-years data structure if the number stored in the damage-month data structure is less than the number stored in the purchase-month data structure.

Statement "DISPLAY 'OWNERSHIP PERIOD IS', DIFFERENCE-PERIOD" 678 indicates that the numbers stored in the difference-years, difference-months, and difference-days data structures (3 years, 4 months, 5 days for Customer X) should be displayed as the ownership period of the manufactured item. Such a display allows the warranty manager to report whether any necessary repairs are covered by the warranty.

Finally, statements "STOP RUN" 682 and "EXIT" 684 indicate ending points for the source code computer program.

Referring now also to FIG. 4, based on the source code text (such as text 602), the compiler software 12 derives machine code computer data constituting directly-executable instructions for execution by the object computer (step 1010). Stored in machine code memory 100, this machine code computer data are derived from source code statements, e.g., statement 674, constituting source code instructions. As described in more detail below, each such source code instruction (e.g., corresponding to statement 674) defines the contents of a corresponding portion of the machine code computer data and defines a corresponding location in the machine code memory 100 for storing the corresponding portion. For example, statement 674 defines the machine code computer data (indicated in hexadecimal notation in accordance with industry standard practices) stored at memory locations 2000 through 2010 (also indicated in hexadecimal notation).

The machine code computer data are formatted in accordance with a machine language (e.g., 80×86 machine language) to allow the object computer to determine directly from the machine code computer data how to execute as specified by the directly-executable instructions. Any machine language may be used, as long as the object computer (which may be any computer, e.g., a mainframe computer such as an IBM System/370 or a Pyramid® NILE™, a minicomputer such as a Digital Equipment Corporation ("DEC") VAX/VMS 6610, or a workstation such as a SPARCstation 20TurboZX Model HS22MP) and the machine language are compatible to allow direct execution by the object computer.

Referring now also to FIG. 5 and chart 200, by way of example, the actions of the compiler software 12 are explained by reference to chart entries 250 through 266. As mentioned before, statement 674 indicates performing a subtraction. The machine code computer data stored at memory locations 2000 through 2010 constitute directly-executable instructions for performing the subtraction of statement 674. In our example, the compiler software 12 assigns a memory location 03F0 to provide the purchase-year data structure defined in statement 636. Similarly, memory locations 07F1 and 0992 are assigned to provide the damage-year and difference-years data structures, respectively, defined in statements 644, 652, respectively.

As shown in chart entry 250, machine code data "50" and "51" are stored at memory locations 2000, 2001, respectively, and represent machine code instructions "PUSH AX" 202 and "PUSH CX" 204, respectively. Instructions 202, 204 are provided for causing the object computer to save the contents of first and second processor registers of the object computer, to free the first and second processor registers for use.

Instruction "ES:" 206 is provided to ensure that the object computer executes properly with respect to subsequent instructions involving the memory locations 03F0, 07F1, and 0992. In particular, instruction 206 directs the object computer to find these memory locations in a particular memory segment specified by a segment register "ES".

Instruction "MOV AX, [07F1]" 208 is provided to indicate that the first processor register is to be updated to hold the value ("95" for Customer X) stored in the damage-year data structure. Similarly, the second processor register is to be updated to hold the value ("92" for Customer X) stored in the purchase-year data structure, as indicated by instruction "MOV CX, [03F0]" 210.

Instruction "SUB AX,CX" 212 is provided to cause the object computer to reduce the value held in the first processor register by the value held in the second processor register. Thus, instruction 212 causes the first processor register to hold the difference between the values stored in the two processor registers. For example, in the case of Customer X above, the value held in the first processor register would be reduced from "95" to "3".

Instruction "MOV [0992],AX" 214 is provided to cause the object computer to update the difference-years data structure to store the value held in the first processor register. In the case of customer X, instruction 214 causes the difference-years data structure to be updated to store the value "3".

For the first and second processor registers, respectively, instructions "POP AX" 218 and "POP CX" 216 are provided to cause the object computer to restore the contents saved in accordance with instructions 202 and 204, respectively.

As described above, source code text 602 (FIGS. 3A, 3B) and the corresponding machine code data of FIG. 4 are sufficient for the case of Customer X, where the damage-year data structure is loaded with a value ("95") that is greater than the value ("92") loaded into the purchase-year data structure. However, as described below, the text 602 and the machine code data of FIG. 4 are not sufficient for a Customer Y having the same purchase date (JAN. 5, 1992) as Customer X but a different damage date of ten years later (i.e., May 10, 2002), which should produce for the difference-years data structure a value of "10". For Customer Y, the damage-year data structure is loaded with the value "2" (reflecting the last two digits of the year 2002). The value "2" is used because statement 648 (FIG. 3A) defines the damage-year data structure so that the damage year data structure is able to store a whole number value having a range of only "0" through "99". As a result, for Customer Y, machine code instruction 208 (FIG. 5) causes the first processor register to hold the value "2", which is reduced by "92" according to instruction 212. Because "2" is less then "92", instruction 212 and instruction 214 do not cause the object computer to update the difference-years data structure to store the correct value ("10" for Customer Y).

FIGS. 6A, 6B illustrate a source code text 700 that addresses the case of Customer Y, i.e., that yields machine code data (FIG. 7) and machine code instructions (FIG. 8) that do cause the object computer to update the difference-year data structure to store the correct value. The only differences between source code text 602 and source code text 700 are added logic appearing in statements 702, 704, 706, 708 of source code text 700. Statements "10 PURCHASE-YEAR PIC 999" 702 and "10 DAMAGE-YEAR PIC 999" 704 include "PIC 999" instead of "PIC 99", to allow the respective purchase-year and damage-year data structures to store a whole number value having an upper limit of "999" instead "99". Statements "IF DAMAGE-YEAR<76 ADD 100 TO DAMAGE-YEAR" 706 and "IF PURCHASE-YEAR<76 ADD 100 TO PURCHASEYEAR" 708 are source code "windowing logic" statements provided to indicate that each of the numbers stored in the damage-year and purchase-year data structures, respectively, is to be increased by "100" if the number is less than "76".

Effectively, the source code windowing logic statements define a window of years extending from the seventy-sixth year of one century through the seventy-fifth year of a subsequent century (where each century begins with a zeroeth year). Providing an increase of "100" for numbers less than "76" allows such numbers to be treated as numbers greater than "99" for the purposes of calculating time intervals or comparing dates in accordance with the window of years. For example, according to the window of years, the year values "70" and "80" represent the years "2070" and "1980", respectively, which are endpoints of a time interval of 90 years, calculated by subtracting "1980" from "2070". Increasing the year value "70" to "170" allows an equivalent subtraction ("80" from "170" to produce "90") without having to change both of the year values.

Additional statements are provided after statement 710 (which is the same as statement 674 of source code text 602 (FIG. 3B)) to cause the object computer to reverse any increases performed in accordance with statements 706, 708. Such reversal prevents the increases from causing problems as a result of other statements (such as display statements) that do not anticipate that the numbers stored in the damage-year and purchase-year data structures could be greater than 99. Alternatively, one or more additional data structures can be defined and statements 706, 708, 710 can be replaced with statements that use the one or more additional data structures to accomplish the result of statements 706, 708, 710 without altering the damage-year or purchase-year data structures. For example, the one or more additional data structures could be used to hold copies of the values held by the damage-year and purchase-year data structures.

Based on source code text 700, the compiler software 12 generates the machine code data illustrated in FIG. 7 and chart entries 302–350 of chart 300 (FIG. 8). The machine code data of FIGS. 7, 8 consists of the machine code data of FIGS. 4, 5 (represented in chart 300 by chart entries 334–350) and additional machine code data ("machine code windowing logic") represented by chart entries 302–332. Chart entries 302–316 correspond to statement 706 (FIG. 6B) and chart entries 318–332 correspond to statement 708.

Chart entries 302, 304, 306 indicate that according to respective instructions 352, 354, 356 (having functions already described with respect to instructions 202, 206, 208 respectively), the first processor register is to be updated to hold the value ("2" for Customer Y) stored in the damage-year data structure. Next, chart entry 308 indicates that machine code data "3D 4C 00" is used to represent machine code instruction "CMP AX,004C" 358, which is provided to cause the value ("2" for Customer Y) held in the first processor register to be compared with the number "76" (expressed in hexadecimal notation as "004C" in instruction 358).

After instruction 358 are instruction "JNB 200D" 360 represented by machine code data "73 03" in chart entry 310 and instruction "ADD AX,0064" 362 represented by machine code data "83 64 00" in chart entry 312. Instruction 360 is provided to cause the object computer to skip instruction 362 (by jumping three memory addresses ahead as indicated by "03" in the machine code data) if the comparison of instruction 358 indicates that the value ("2" for Customer Y") held in the first processor register is not less than the number "76". (For Customer Y, instruction 362 is not skipped.) According to instruction 362, the value held in the first processor register is to be increased by "100" (to "102" for Customer Y) (100 being expressed in hexadecimal notation as "0064" in instruction 362). Instruction "MOV [07F1] ,AX" 364 is provided to cause the object computer to store in the damage-year data structure the increased value ("102" for Customer Y) held in the first processor register.

As shown in chart entries 318–332, instructions 368–382 are provided to cause the object computer to act upon the purchase-year data structure in the same way that instructions 352–366 cause the object computer to act upon the damage-year data structure. In the case of Customer Y, the damage-year and purchase-year data structures end up storing "102" and "92", respectively. As a result, according to statement 710 and machine code instructions 384–400, the object computer updates the difference-years data structure to store the correct value ("10" for Customer Y).

In accordance with the invention, FIGS. 9A and 9B illustrate another source code text 750, which is identical to source code text 602 (FIGS. 3A, 3B), except for statements 752, 754 corresponding to respective statements 636, 644 of source code text 602. Note the absence of source code windowing logic statements. Each of the statements 752, 754 includes a text string "TYPE IS DATE" to notify the compiler software 12 that the purchase-year and damage-year data structures, respectively, are to be used for storing date information. As described below, based on the notification, the compiler software 12 generates for subtraction statement 756 (which is identical to statement 674 of source code text 602) the machine code data of FIGS. 10, 11 instead of the machine code data of FIGS. 4, 5.

The compiler software executes as described above with respect to steps 1000, 1010. The compiler software 12 stores a set of predetermined machine code data (e.g., "3D 4C 00 73 03 83 64 00") constituting machine code windowing logic. By parsing the source code text 750, the compiler software 12 identifies in the text 750 each statement (such as statement 756) that includes the year text string (e.g., "PURCHASE-YEAR" of statement 752 or "DAMAGE-YEAR" of statement 754) associated with the "TYPE IS DATE" notification discussed above (step 1020). Such identification relies on a noted year text strings table that indicates every noted year text string, i.e., every year text string associated with the notification. In the source code text 750, each statement is tested against the noted year text strings table to determine whether the statement includes one of the noted year text strings.

By parsing the identified statement, the compiler software 12 then determines whether the identified statement pertains to an arithmetic operation (e.g., the subtraction of statement 756) involving the year value of the year data structure defined by the noted year text string, or to comparing the year value with another year value (to be described) (step 1030).

If the identified statement pertains to such an arithmetic operation or such a comparison, the compiler software 12 acts as follows. As the compiler software 12 generates machine code data based on the source code text (e.g., the machine code data of FIG. 10 based on the source code text 750), the compiler software 12 then inserts computer data constituting one or more directly-executable instructions for causing the object computer to interpret the year value in accordance with a predetermined interpretation scheme (step 1040).

In particular, chart 500 of FIG. 11 has chart entries 502–534 indicating machine code data representing machine code instructions 536–566 generated by the compiler software 12 for statement 756 (FIG. 9B), which is identical to statement 674 of source code text 602. Instructions 560–566 constitute a subroutine containing the machine code windowing logic. According to the subroutine, the machine code windowing logic is applied to any value resident in the first processor register.

Instructions "CALL 2030" 544, 550 are calling instructions provided to cause the object computer to execute the subroutine to apply the windowing logic to the year values retrieved from the purchase-year and damage-year data structures, respectively. The calling instructions are provided because during parsing the word "SUBTRACT" of statement 756 is detected as giving rise to an arithmetic operation involving one or more year values associated with a "TYPE IS DATE" notification.

Instruction "RET" 566 is provided to cause the object computer to resume processing with an instruction following the calling instruction. To cause the object computer to prepare for the subtraction of instruction 552, and to free the first processor register for use with the subroutine, instruction "XCHG CX,AX" 546 is provided for exchanging the values stored in the first and second processor registers.

According to the subroutine, for Customer Y, the value retrieved from the damage-year data structure is increased from "2", which is less than "76", to "102". This increase allows the object computer to store in the difference-years data structure the difference expected ("10" for Customer Y).

Usually, the source code text also includes statements pertaining to copying or displaying the value stored in the data structure associated with the year text string of step 1020 above. In general, windowing logic need not be provided in connection with such statements, which treat the value merely as a piece of computer data. However, as an extra precaution, when the compiler software 12 detects that the statement identified in step 1020 above pertains to copying the value to a destination data structure lacking an association with the notification (i.e., "TYPE IS DATE", as discussed above), the compiler software 12 presents a warning. The warning is presented on an output device such as a computer screen or a printer and indicates that perhaps the destination data structure ought to be associated with the notification, which would allow the compiler software 12 to provide windowing logic in connection with destination data structure. Providing such windowing logic becomes important if the destination data structure is involved subsequently in an identified statement pertaining to an arithmetic operation or a comparison as described above.

Referring now to FIGS. 12A–16, an warranty-expiration example is provided to illustrate an outcome based on a comparison detected according to step 1030, described above. As shown in FIGS. 12A–12B, source code text 770 is similar to source code text 602 in many respects. However, source code text 770 is provided to cause an expiration date to be derived from the purchase date. The derivation relies on statement 772 defining an expiration-year data structure and on statement 774, which specifies storing in the expiration-year data structure the sum of ten and the value retrieved from the purchase-year data structure. Then, according to statement 776, "Warranty expired" is displayed if the damage date is after the expiration date.

Source code text 770 may be altered to appear as source code text 780 as shown in FIGS. 13A–13B. Statements 782, 784, 786 define purchase-year, damage-year, and expiration-year data structures according to "PIC 999" as described above in connection with FIG. 6A. Statement 788 provides source code 2-digit logic to specify that "100" is to be subtracted from the value of the expiration-year data structure if the value is greater than "99". This source code 2-digit logic is provided immediately after statement 787 to avoid producing a nonsensical value (such as "102" if the purchase year value is "92") for the expiration-year data structure. Source code windowing logic statements 790, 792 are also provided.

Alternatively, in accordance with the invention, source code text 770 may be altered to appear as source code text 800 as shown in FIGS. 13A–13B. The only differences between source code texts 770 and 800 are the "TYPE IS DATE" notifications provided in statements 802, 804, 806. According to procedure 170 of FIG. 2, source code text 800 yields machine code instructions 652–696 shown in chart entries 602–650 of chart 600 of FIGS. 15, 16. Statement 808 (FIG. 14B) yields instructions 652–664, which include instruction "CALL 2049" 660 to cause the object computer to execute instructions 690–696 constituting a machine code 2-digit logic subroutine.

Instructions 682–688 constitute a machine code windowing logic subroutine as described above in connection with FIG. 11. Statement 810 yields instructions 666–680, which specify executing the machine code windowing logic subroutine for both the expiration-year and damage-year data structures (instructions "CALL 2040" 670, 676, respectively) and then branching to display-related instructions (not shown) if the value held by the damage-year data structure is greater than the value held by the expiration-year data structure (instructions "CMP AX,CX" 678 and "JA 2060" 680). (It is possible that the damage date is after the expiration date even if the value held by the damage-year data structure is not greater than the value held by the expiration-year data structure (e.g., if the damage date is after the expiration date in the same year). Such a possibility is investigated according to other instructions represented by ellipses in chart entry 634 and not discussed here.)

Instructions 670, 676 are provided because during parsing the greater-than symbol (">") of statement 810 is detected (in accordance with step 1030 (FIG. 2)) as giving rise to a comparison involving one or more year values associated with a "TYPE IS DATE" notification.

The technique (i.e., the procedures described above) may be implemented in hardware or software, or a combination of both. Preferably, the technique is implemented in one or more computer programs (such as the compiler software) executing on one or more programmable computers, each including a processor, a storage medium (including volatile and non-volatile memory and/or storage elements) readable by the processor, at least one input device, and at least one output device. Program code is applied to data (such as a file name of a computer file holding the source code text) entered using the input device to perform the technique described above and to generate output information (such as a report that the machine code data has been generated successfully). This output information is applied to one or more output devices, such as a computer screen or a computer printer.

Each program is preferably implemented in accordance with a high-level procedural or object-oriented programming language to communicate with a computer system. However, the programs can be implemented according to an assembly or machine language if desired, e.g., if speed of execution is critical. In any case, the language may be a compiled or interpreted language.

Each such computer program is preferably stored on a storage medium or device (e.g., ROM or magnetic diskette) that is readable by a general- or special-purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, the window of years may be selectable by a user of the compiler software or may be based on the current year to provide a sliding window of years ranging, e.g., from 30 years before the current year through 69 years after the current year. The selection may be provided to the compiler software (e.g., from a computer file or by a user of the compiler software) prior to generation of the machine code data based on the source code text.

In another example, with respect to a value retrieved from a year data structure, the machine code windowing logic may be arranged to cause an increase by an amount (e.g., "1900") sufficient to cause the value to represent explicitly the year to which the value corresponds in the window of years. For example, if the window ranges from 1976 through 2075, "80" would be increased to "1980" and "20" would be increased to "2020". Thus, so increased, the value would be able to be used meaningfully in a calculation or comparison involving another value retrieved from a data structure that represents years in four-digit format (i.e., in accordance with mm/dd/yyyy).

What is claimed is:

1. A computer-based method comprising:

storing source code instructions that include a year variable text string representing a year variable data structure configured to store a time value that is subject to two different interpretations, the year variable text string being associated with a tag string indicating that the represented year variable data structure is so configured, the source code instructions being based on a first one of the two interpretations; and deriving machine code instructions from the source code instructions, the derivation including, for each source code instruction that includes the year variable text string, determining whether the identified source code instruction pertains to an arithmetic or logical operation involving the year value, and if so, inserting a machine code instruction to cause the year value to be interpreted in accordance with a second one of the interpretations, whereby instructions have been included in the derived machine code instructions that use the time value in accordance with the second one of the interpretations, without the human readable procedural instruction sequence having been altered in accordance with the second one of the interpretations.

2. The method of claim 1, wherein the human readable procedural instruction sequence constitutes all of the human readable procedural instructions sequences from which the machine code is derived.

3. The method of claim 1, further comprising compiling the human readable procedural instruction sequence, wherein the instructions are included in the derived machine code during the compilation.

4. The method of claim 3, further comprising providing an indication of a date that is subject to two different interpretations.

5. The method of claim 4, further comprising in the human readable procedural instruction sequence, associating the indication with a data declaration.

6. The method of claim 1, further comprising parsing the human readable procedural instruction sequence to determine a source of the effect.

7. The method of claim 6, wherein a computation serves as the source.

8. The method of claim 7, wherein a calculation of a time interval is based on the computation.

9. The method of claim 6, wherein a comparison of times serves as the source.

10. The method of claim 6, wherein the parsing is based on an indication of a date that is subject to two different interpretations.

11. The method of claim 6, further comprising parsing the human readable procedural instruction sequence to determine a potential source of the effect; and determining whether the potential source is the source.

12. The method of claim 11, further comprising providing a warning based on the potential source.

13. The method of claim 1, wherein the instructions included in the derived machine code are arranged to use the time value in accordance with the second one of the interpretations at the point in the derived machine code at which the time value is retrieved.

14. The method of claim 1, wherein a time window serves as a basis for use of the time value by the instructions included in the derived machine code.

15. The method of claim 1, wherein the time value comprises a year value representing a year, and the year value lacks an explicit indication of the century of the year.

16. The method of claim 1, wherein the time value comprises a year value representing a year, and the year value lacks an explicit indication of the millenium of the year.

17. The method of claim 1, wherein the time value falls within a 100 year window that spans a century boundary.

18. The method of claim 1, wherein at least a portion of the human readable procedural instruction sequence is formatted in accordance with Common Business Oriented Language (COBOL).

19. The method of claim 1, wherein the derived machine code uses the time value in connection with another time value that is subject to only one interpretation.

20. Computer software, residing on a computer-readable storage medium, comprising a first set of instructions for use in a computer system to cause the computer system to reduce an effect caused when machine code uses a time value that is subject to two different interpretations, the machine code having been derived from a human readable procedural instruction sequence that is based on a first one of the interpretations, the first set of instructions causing the system to:

storing source code instructions that include a year variable text string representing a year variable data structure configured to store a time value that is subject to the two different interpretations, the year variable text string being associated with a tag string indicating that the represented year variable data structure is so configured; and deriving machine code instructions from the source code instructions, the derivation including, for each source code instruction that includes the year variable text string, determining whether the identified source code instruction pertains to an arithmetic or logical operation involving the year value, and if so, inserting a machine code instruction to cause the year value to be interpreted in accordance with a second one of the interpretations, whereby instructions have been included in the derived machine code instructions that use the time value in accordance with the second one of the interpretations, without the human readable procedural instruction sequence having been altered in accordance with the second one of the interpretations.

21. The computer software of claim 20, wherein the human readable procedural instruction sequence constitutes all of the human readable procedural instructions sequences from which the machine code is derived.

22. The computer software of claim 20, wherein the computer software further comprises instructions for causing the system to compile the human readable procedural instruction sequence, wherein the second set of instructions are included in the derived machine code during the compilation.

23. The computer software of claim 22, wherein the computer software further comprises instructions for causing the system to provide an indication of a date that is subject to two different interpretations.

24. The computer software of claim 23, wherein the computer software further comprises instructions for causing the system to, in the human readable procedural instruction sequence, associate the indication with a data declaration.

25. The computer software of claim 20, wherein the computer software further comprises instructions for causing the system to parse the human readable procedural instruction sequence to determine a source of the effect.

26. The computer software of claim 25, wherein a computation serves as the source.

27. The computer software of claim 26, wherein a calculation of a time interval is based on the computation.

28. The computer software of claim 25, wherein a comparison of times serves as the source.

29. The computer software of claim 25, wherein the parsing is based on an indication of a date that is subject to two different interpretations.

30. The computer software of claim 25, wherein the computer software further comprises instructions for causing the system to parse the human readable procedural instruction sequence to determine a potential source of the effect; and determine whether the potential source is the source.

31. The computer software of claim 30, wherein the computer software further comprises instructions for causing the system to provide a warning based on the potential source.

32. The computer software of claim 20, wherein the second set of instructions are arranged to use the time value in accordance with the second one of the interpretations at the point in the derived machine code at which the time value is retrieved.

33. The computer software of claim 20, wherein a time window serves as a basis for use of the time value by the second set of instructions.

34. The computer software of claim 20, wherein the time value comprises a year value representing a year, and the year value lacks an explicit indication of the century of the year.

35. The computer software of claim 20, wherein the time value comprises a year value representing a year, and the year value lacks an explicit indication of the millenium of the year.

36. The computer software of claim 20, wherein the time value falls within a 100 year window that spans a century boundary.

37. The computer software of claim 20, wherein at least a portion of the human readable procedural instruction sequence is formatted in accordance with Common Business Oriented Language (COBOL).

38. The computer software of claim 20, wherein the derived machine code uses the time value in connection with another time value that is subject to only one interpretation.

* * * * *